(12) United States Patent
Valenti et al.

(10) Patent No.: US 9,450,335 B2
(45) Date of Patent: Sep. 20, 2016

(54) RJ45 PLUG LATCH GUARD WITH INTEGRATED RELEASE TAB

(71) Applicant: Panduit Corp., Tinley Park, IL (US)

(72) Inventors: Joshua A. Valenti, Wheeling, IL (US); Jeremy S. Parrish, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/599,603

(22) Filed: Jan. 19, 2015

(65) Prior Publication Data

US 2016/0211610 A1 Jul. 21, 2016

(51) Int. Cl.
*H01R 13/627* (2006.01)
*F16B 2/22* (2006.01)
*H01R 24/64* (2011.01)
*H01R 43/16* (2006.01)
*H01R 107/00* (2006.01)

(52) U.S. Cl.
CPC ............. *H01R 13/6275* (2013.01); *F16B 2/22* (2013.01); *H01R 24/64* (2013.01); *H01R 43/16* (2013.01); *H01R 2107/00* (2013.01)

(58) Field of Classification Search
USPC ...................... 439/345, 352, 344, 133; 70/57
See application file for complete search history.

(56) References Cited

U.S. PATENT DOCUMENTS

| 4,647,726 A * | 3/1987 | Blum ............................ 379/435 |
| 4,870,840 A * | 10/1989 | Klein ................................ 70/57 |
| 5,562,475 A * | 10/1996 | Kern et al. ..................... 439/344 |
| 6,406,325 B1 * | 6/2002 | Chen ............................. 439/418 |
| 6,409,544 B1 * | 6/2002 | Wu ........................... 439/607.05 |
| 6,821,024 B2 * | 11/2004 | Bates, III ........................ 385/76 |
| 6,851,957 B1 * | 2/2005 | Bhogal et al. ................ 439/133 |
| 7,371,086 B2 * | 5/2008 | Yamada et al. ............... 439/133 |
| 7,425,159 B2 * | 9/2008 | Lin ............................... 439/676 |
| 7,892,012 B1 * | 2/2011 | Foung ........................... 439/352 |
| 7,909,625 B2 * | 3/2011 | Obenshain .................... 439/133 |
| 8,038,460 B2 * | 10/2011 | Andres et al. ................ 439/344 |
| 8,348,686 B1 * | 1/2013 | Huang .......................... 439/133 |
| 8,529,284 B1 * | 9/2013 | Smith .......................... 439/352 |
| 8,545,243 B2 * | 10/2013 | Lin ............................... 439/133 |
| 8,632,352 B2 * | 1/2014 | Wagner ........................ 439/352 |
| 8,870,589 B2 * | 10/2014 | Su et al. ....................... 439/404 |
| 2003/0096529 A1 * | 5/2003 | Brennan et al. ............. 439/418 |
| 2011/0115494 A1 * | 5/2011 | Taylor et al. ................. 324/537 |

\* cited by examiner

*Primary Examiner* — Alexander Gilman
(74) *Attorney, Agent, or Firm* — Christopher S. Clancy; James H. Williams; Christopher K. Marlow

(57) ABSTRACT

In one embodiment, a latch guard includes a plug end configured for gripping a communication plug and a pull tab extending from the plug end. The pull tab can include an arm connected to the plug end and can further include a loop connected to the arm opposite the plug end. The plug end of the latch guard can include a hood configured for at least partially covering the latch of the communication plug when the latch guard is installed on the communication plug. The plug end of the latch guard can have at least three sides, and the communication plug can have a housing with at least one depression, where at least one of the sides of the plug end of the latch guard can include a tab for engaging at least one depression of the plug housing.

10 Claims, 20 Drawing Sheets

RJ45 PLUG LATCH GUARD WITH INTEGRATED RELEASE TAB

BACKGROUND OF THE INVENTION

Currently in the telecommunications market there is a potential for the loss of network connectivity due to accidental removals of plugs. In the case of accidental removals, this may occur for many reasons, one such reason is due to high density within datacenters causing the latches on RJ45 plugs to be within close vicinity; sometimes while removing one cord an adjacent cord is accidentally jostled or altogether disconnected. Another reason for accidental plug removal comes from the lack of visibility, which sometimes causes human error and the wrong cord is removed as it is grabbed incorrectly. In some applications, multiple operators are required (one person for unplugging and the other for confirming the correct plug) in order to avoid mistakes which adds to labor costs.

In the telecommunications market conduit, raceways, or other cable management equipment can be used to protect and house electrical wires. There are a variety of methods that can be used for pulling wire through conduit. One common method of pulling cables through conduit is through the usage of fiberglass fish tape, in which the fish tape is first fed through conduit and attached to one end of the cable through the usage of electrical tape, and then the cable is pulled through the conduit. When the fish tape is secured to cable it is taped onto the round surface of the cable and potentially has the tendency to slip, which means the whole feeding process needs to start over from the beginning.

What is needed is a device that prevents the accidental release of an RJ45 cord that is both easy to install and remove, and which is tool-less.

SUMMARY OF THE INVENTION

In one embodiment, the present invention includes a latch guard for a communication plug having a latch where the latch guard includes a plug end configured for gripping the communication plug and a pull tab extending from the plug end. The pull tab can include an arm connected to the plug end and can further include a loop connected to the arm opposite the plug end. The plug end of the latch guard can include a hood configured for at least partially covering the latch of the communication plug when the latch guard is installed on the communication plug. The plug end of the latch guard can have at least three sides, and the communication plug can have a housing with at least one depression, where at least one of the sides of the plug end of the latch guard can include a tab for engaging at least one depression of the plug housing. At least one depression of the communication plug housing can be a crimp window. In one embodiment the communication plug is an RJ45 plug.

In another embodiment, the present invention includes a communication cord with a communication cable and a communication plug connected to the communication cable, where the communication plug includes a latch. A latch guard can be connected to the communication plug, where the latch guard has a plug end configured for gripping the communication plug, and a pull tab extending from the plug end. The pull tab can include an arm connected to the plug end and can further include a loop connected to the arm opposite the plug end. The plug end of the latch guard can include a hood configured for at least partially covering the latch of the communication plug when the latch guard is installed on the communication plug. The plug end of the latch guard can have at least three sides, and the communication plug can have a housing with at least one depression, where at least one of the sides of the plug end of the latch guard can include a tab for engaging at least one depression of the plug housing. At least one depression of the communication plug housing can be a crimp window. In one embodiment the communication plug is an RJ45 plug.

In another embodiment, the present invention includes a method of installing and uninstalling a communication plug in a communication jack. The method includes the steps of: placing a latch guard onto the communication plug; inserting the communication plug into the communication jack; pulling a pull tab of the latch guard tab to release the latch guard; depressing a latch of the communication plug; and removing the communication plug from the communication jack.

In another embodiment, the present invention includes a method of installing a communication cord into a communication equipment. The method includes the steps of: placing a latch guard onto a communication plug of the communication cord; drawing the communication cord through one of a raceway and conduit by pulling on the latch guard; removing the latch guard from the communication plug; reversing an orientation of the latch guard relative to the communication plug; re-installing the latch guard onto the communication plug; and inserting the communication plug into a communication jack of the communication equipment.

DETAILED DESCRIPTION

FIGS. 1-8 show one embodiment of a RJ45 plug latch guard with an integrated release tab that can engage a crimp window of an RJ45 plug and can easily be removed through the application of pressure on the release tab.

Figure 1:
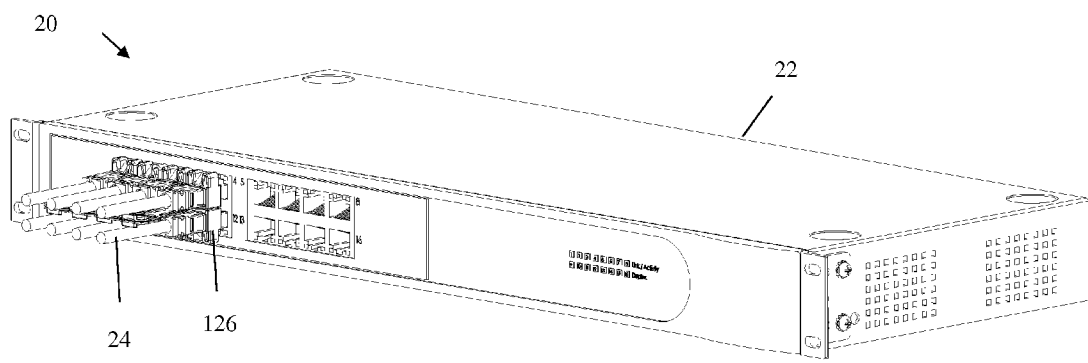
FIG. 1 is an isometric view of a communication system utilizing a first embodiment of a plug latch guard.

FIG. 1 the present invention includes communication system 20 with switch 22 populated with RJ45 cords 24 (such as a patch, zone, or other cord) with latch guard 126 installed. Equipment 22 is illustrated as a switch in FIG. 1, but equipment 22 can be passive or active equipment. Examples of passive equipment can be, but not limited to, modular patch panels, punch-down patch panels, wall jacks, etc. Examples of active equipment can be, but are not limited to, Ethernet switches, routers, servers, physical layer management systems, and power-over Ethernet equipment as can be found in data centers/telecommunications rooms; security devices (cameras and other sensors, etc.) and door access equipment; and telephones, computers, fax machines, printers and other peripherals as can be found in workstation areas. Communication system 20 can further include cabinets, racks, cable management (such as raceways, conduit and other cable management apparatus) and overhead routing systems, and other such equipment.

The present invention can be applied to and/or implemented in a variety of unshielded or shielded communications cables or systems; any of CAT5E, CAT6, CAT6A, CAT7, CAT8 and other twisted pair Ethernet cable, as well as other types of cable. Cord 24 can have its other end (not shown) terminated directly into similar equipment 22, or alternatively, can be terminated in a variety of plugs or jack modules such as RJ45 or other types, jack module cassettes, and many other connector types, or combinations thereof. Further, cords 24 can be processed into looms, or bundles, of cables, and additionally can be processed into pre-terminated looms. Cords 24 can be used in a variety of structured cabling applications including patch cords, zone cords, backbone cabling, and horizontal cabling, although the present invention is not limited to such applications. In general, the present invention can be used in military, industrial, telecommunication, computer, data communications, marine and other applications.

Figure 2:
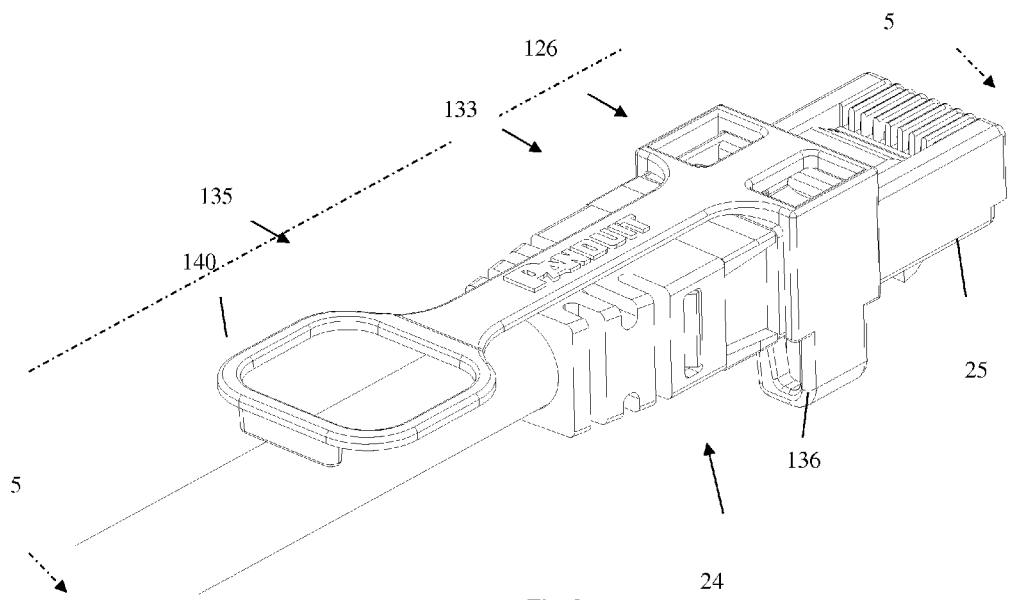
FIG. 2 is an isometric view of an RJ45 patchcord with an installed plug latch guard.
Figure 3:
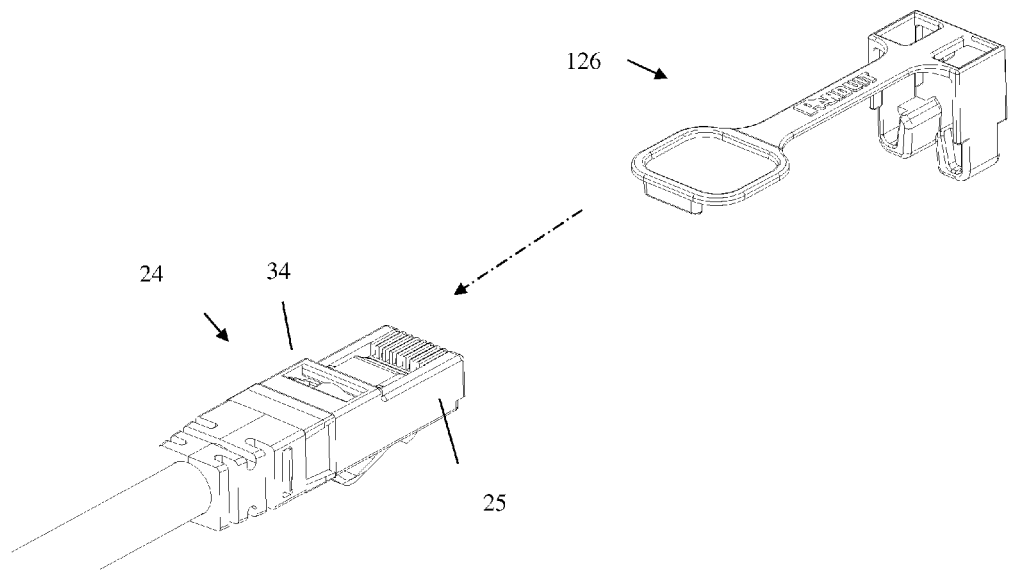
FIG. 3 is an exploded isometric view of the RJ45 patchcord and plug latch guard of FIG. 2
Figure 4:
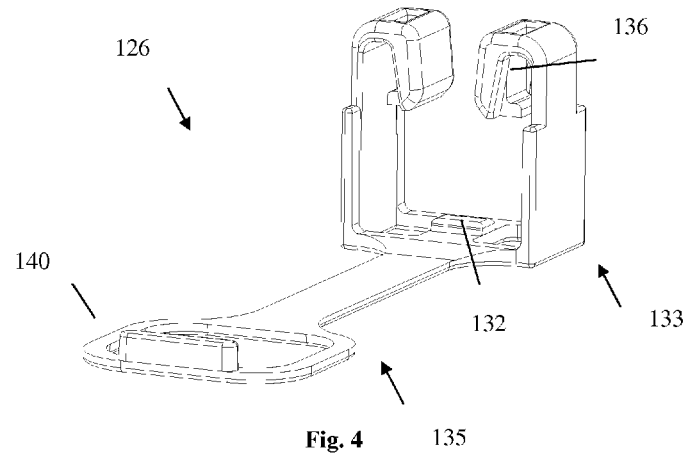
FIG. 4 is a rear isometric view of the plug latch guard of FIG. 2 rotated 180° about the cable axis.

FIG. 2 is an isometric view of RJ45 patchcord 24 with latch guard 126 installed, and FIG. 3 is an exploded isometric view in the orientation in which latch guard 126 would be installed onto RJ45 cord 24. FIG. 4 shows an isometric view of latch guard 126 rotated 180° about the cable axis. As shown best in FIG. 4, plug latch guard 126 includes release tab 140. A portion of release tab 140 is configured to engage a bottom of plug 25 of RJ45 patchcord 24 (the bottom of plug 25 being the side opposite of latch 38). Arms 136 extend from opposite sides of front end 133 of release tab 140 such as to wrap around opposite sides of plug 25. Arms 136 on latch guard 126 extend higher than the apex of latch 38 to prevent depression of latch 38. In one embodiment, arms 136 can curve inward towards each other after extending past the apex of latch 38 and then contact the top surface of plug 25 to provide additional support.

Figure 5:
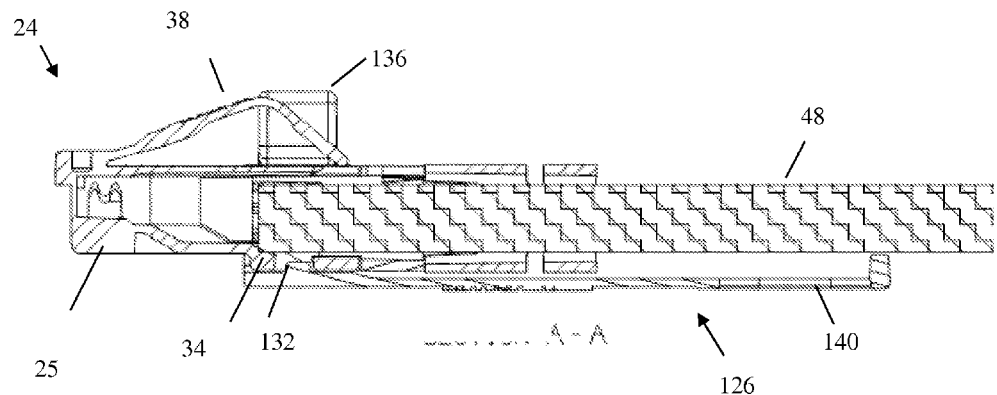
FIG. 5 is a cross-sectional view of the RJ45 patchcord and plug latch guard of FIG. 2 taken along section line 5-5 of FIG. 2

FIG. 5 is a cross-sectional view taken about section line 5-5 in FIG. 2, with tab 132 is inserted into crimp window 34, which is how latch guard 126 is secured to RJ45 cord 24. When latch guard 126 is installed on RJ45 patchcord 24, and there is an adjacent RJ45 patchcord 24 with latch guard 126 installed, arms 136 flex out perpendicular to the cable axis such that arms 136 interfere and prevent removal.

Figure 6:
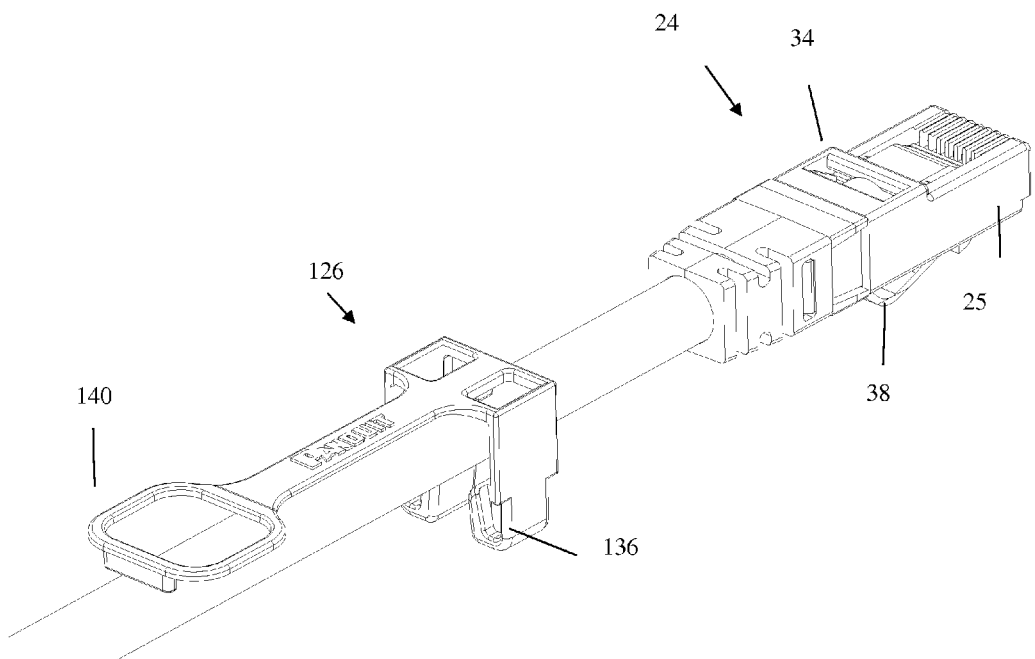
FIG. 6 is an isometric view of the RJ45 patchcord and plug latch guard of FIG. 2 in the orientation in which the latch guard is removed though the use of a release tab.

FIG. 6 is an isometric view in the orientation in which latch guard is removed from RJ45 patchcord 24 through the use of release tab 140; latch guard 126 does not need to be completely removed from RJ45 patchcord 24 in order to release plug latch 38.

Figure 7:
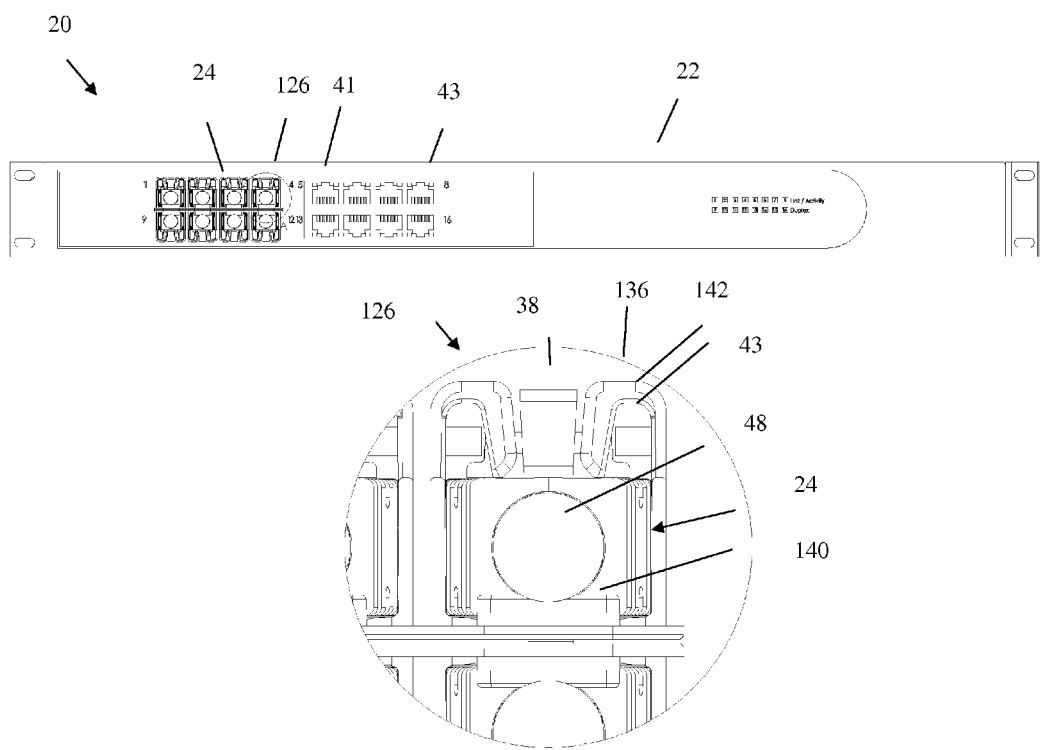
FIG. 7 is a front view of the communication system of FIG. 1, focusing on a single port.

FIG. 7 is a front view of communication systems 20, focused on a single port 41. Openings 142 on arms 136, allow for visibility of indicators/LED lights 43 on the front of the port 41.

Figure 8:
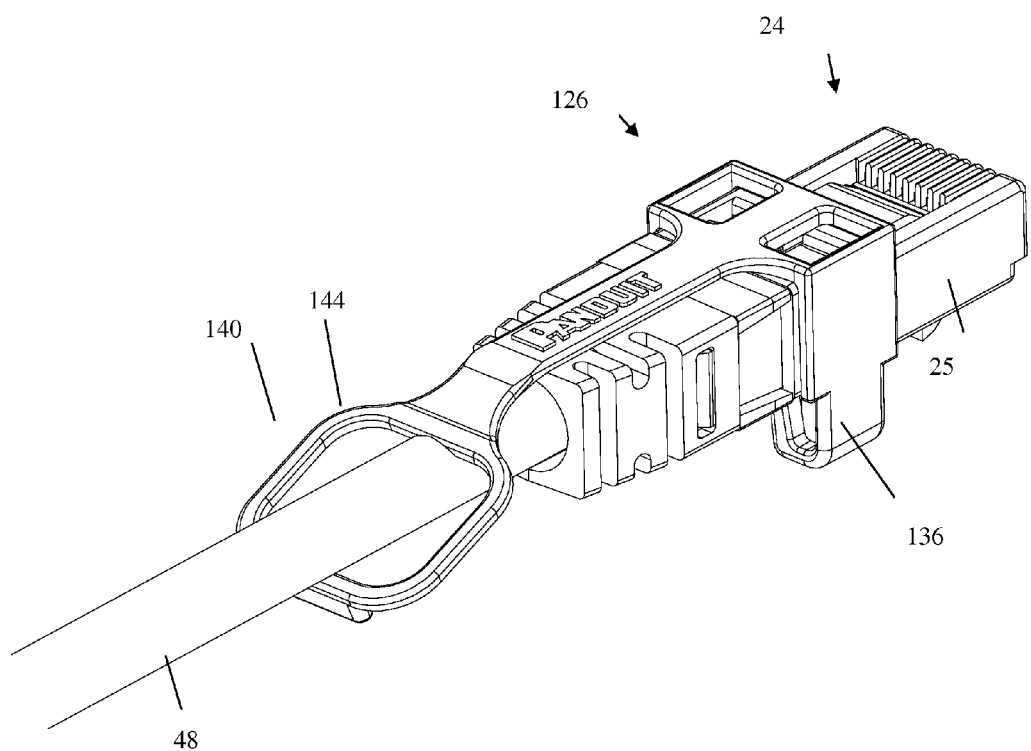
FIG. 8 is an isometric view of an alternate method of installing the plug latch guard of FIG. 2 onto the RJ45 patchcord of FIG. 2.

An alternate way of assembly of latch guard 126 onto RJ45 patchcord 24 is shown in FIG. 8 in which patchcord 24 is fed through opening 144 on back end 135 of release tab 140. Opening 144 on release tab 140 is large enough that RJ45 patchcord 24 can fit through opening 144 after patchcord 24 has been assembled. An advantage of this type of installation is that on smaller diameter cables 48 the separation between arms 136 is large enough that latch guard 126 may become dislodged from patchcord 24 and can become lost; consequently, the method of FIG. 8 avoids inadvertent dislodging of guard 126 from patchcord 24. Also, with this alternate way of assembly latch guard 126 applies pressure to cable 48 when not in use such that latch guard 126 does not slide along the length of the cable and become misplaced. Additionally, in this alternate orientation release tab 140 is easier to differentiate during removal between the top and the bottom levels due to increased separation between release tabs 140. However, this orientation does add to the amount of time needed to assemble latch guard 26 onto RJ45 patchcord 24, and in a brownfield application RJ45 patchcord 24 would need to be unplugged on at least one side of communication system 20.

FIGS. 9-15 show an alternate embodiment of a RJ45 plug latch guard with an integrated release tab that engages the crimp window of an RJ45 plug and can easily be removed through the application of pressure on the release tab. This embodiment allows for an unobstructed view of indicator LEDs as well as release tabs in the opposite orientation as those of the embodiment of FIGS. 1-8.

Figure 9:
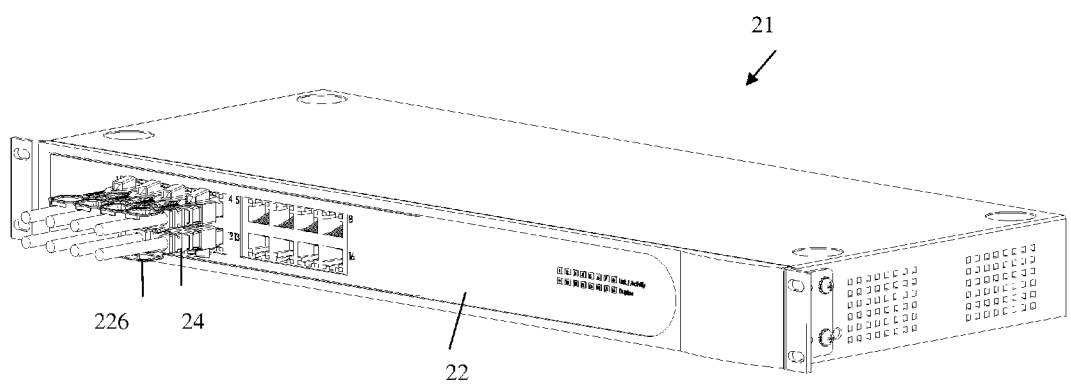
FIG. 9 is an isometric view of a communication system utilizing a second embodiment of a plug latch guard.

FIG. 9 shows system 21 with switch 22 populated with RJ45 patchcords 24 with a second embodiment of latch guard 226 installed. Communication system 21 can further include cabinets, racks, cable management, patch panels, overhead routing systems, horizontal cabling, and other such equipment.

Figure 10:
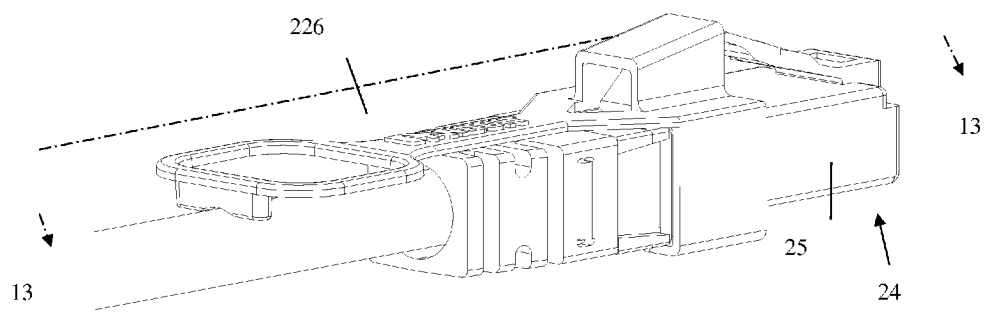
FIG. 10 is an isometric view of an RJ45 patchcord with an installed alternate plug latch guard.
Figure 11:
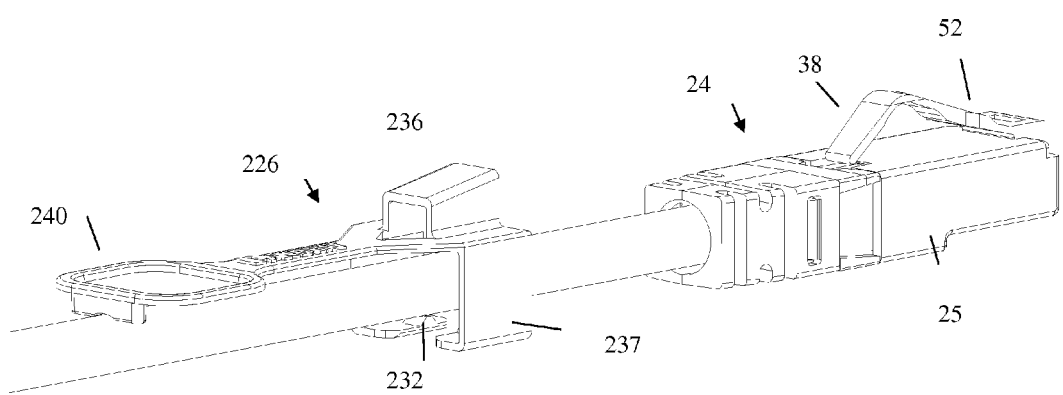
FIG. 11 is an exploded isometric view of the RJ45 and plug latch guard of FIG. 10.
Figure 12:
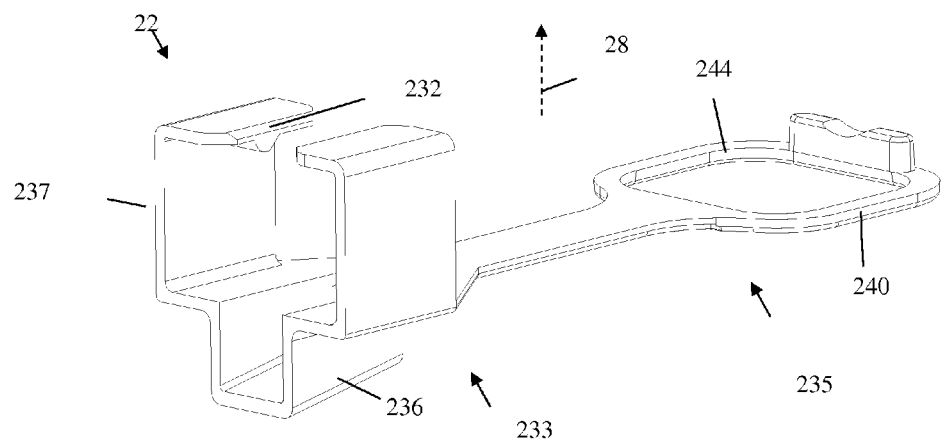
FIG. 12 is a rear isometric view of the plug latch guard of FIG. 10 rotated 180° about the cable axis.

FIG. 10 is an isometric view of RJ45 patchcord 24 with latch guard 226 installed, and FIG. 11 is an exploded isometric view in the orientation in which latch guard 226 would be installed onto RJ45 patchcord 24. This is different than the RJ45 plug latch guard of FIGS. 1-8, as latch guard 226 is installed from the rear instead of the front. FIG. 12 shows an isometric view of latch guard 226 rotated 180° about the cable axis and rotted 180° about the vertical axis 28. As shown best in FIG. 12, latch guard 226 includes release tab 240 which is to engage a top of plug 25. Release tab 240 also has ramp 236 molded into it at a front end 233 of release tab 236. Ramp 236 on latch guard 226 extends higher than the apex of RJ45 plug latch 38 to prevent depression of latch 38. Arms 237 extend from opposite sides of front end 233 of release tab 240 such as to surround the sides of plug 25. Arms 237 then turn inwards towards each other at their respective ends.

Figure 13:
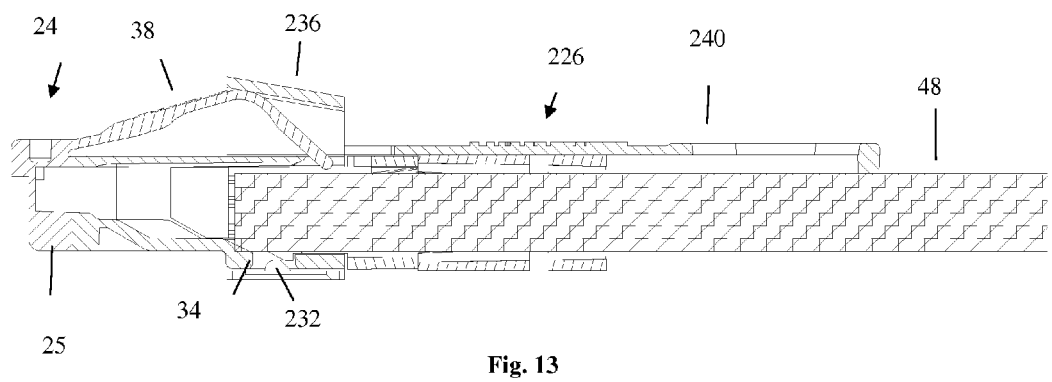
FIG. 13 is a cross-sectional view of the plug latch guard and RJ45 patchcord of FIG. 10 taken along section line 13-13 of FIG. 10.

FIG. 13 is a section view taken about section line 13-13 in FIG. 10, with tab 232, located at the end one or more arms 237, is inserted into crimp window 34, which is how latch guard 226 is secured to RJ45 patchcord 24. When latch guard 226 is installed on RJ45 patchcord 24, and there is an adjacent RJ45 patchcord 24 with latch guard 226 installed, arms 237 flex out perpendicular to the cable axis such that arms 237 interfere and prevent removal.

Figure 14:
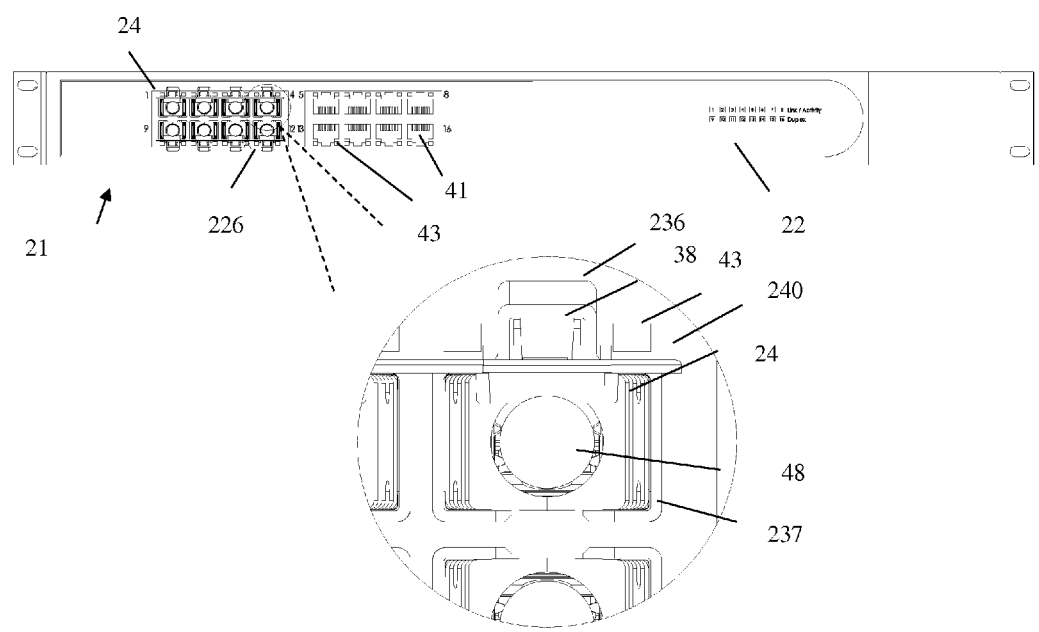
FIG. 14 is a front view of the communication system of FIG. 9, focusing on a single port.

FIG. 14 is a front view of communication systems 21, focused on a single port 41. Ramp 236 is positioned such that it allows for visibility of indicators/LED lights 43 on the front of the port 41. Release tab 240 is positioned such that in switch 22 release tab 240 is towards the outside of switch 22 to increase accessibility.

Figure 15:
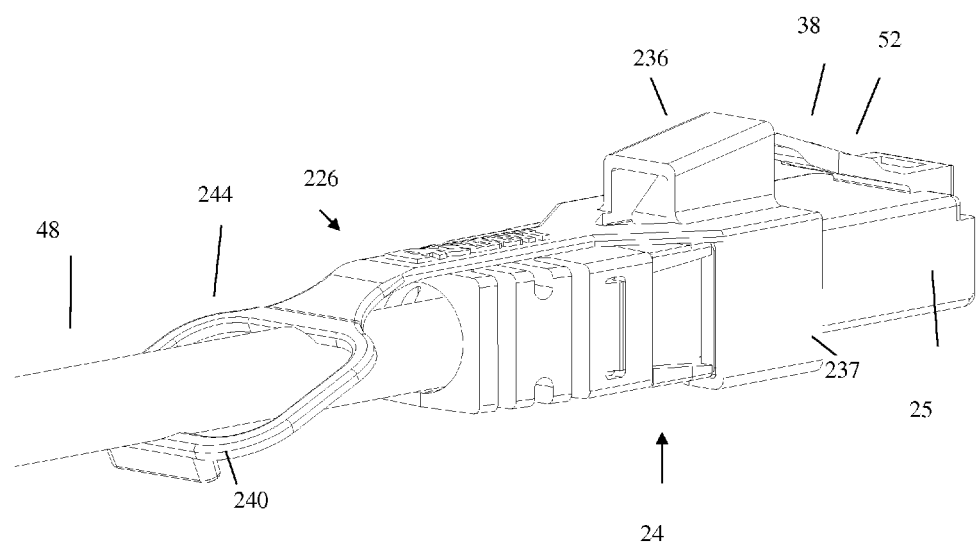
FIG. 15 is an isometric view of an alternate method of installing the plug latch guard of FIG. 10 onto the RJ45 patchcord of FIG. 10.

An alternate way of assembly of latch guard 226 on RJ45 cord 24 is shown in FIG. 15 in which cord 24 is fed through opening 244 on back end 235 of release tab 240. Opening 244 on release tab 240 is large enough that RJ45 cord 24 can fit through opening 244 after cord 24 has been assembled. An advantage of this type of installation is that on smaller diameter cables 48 the separation between arms 237 is large enough that latch guard 226 may become dislodged from cord 24 and can become lost; consequently, the method of FIG. 15 avoids inadvertent dislodging of guard 226 from cord 24. Also, with this alternate way of assembly latch guard 226 applies pressure to cable 48 when not in use such that latch guard 226 does not slide along the length of the cable and become misplaced. However, this orientation does add to the amount of time needed to assemble latch guard 226 onto RJ45 cord 24, and in a brownfield application RJ45 cord 24 would need to be unplugged on at least one side of communication system 21.

FIGS. 16-25 show another alternate embodiment of an RJ45 plug latch guard with an integrated release tab that engages the crimp window of an RJ45 plug and can easily be removed through the application of pressure on the release tab. This alternate embodiment includes pockets on the latch guard which allows the added functionality as acting as pulling eye.

Figure 16:
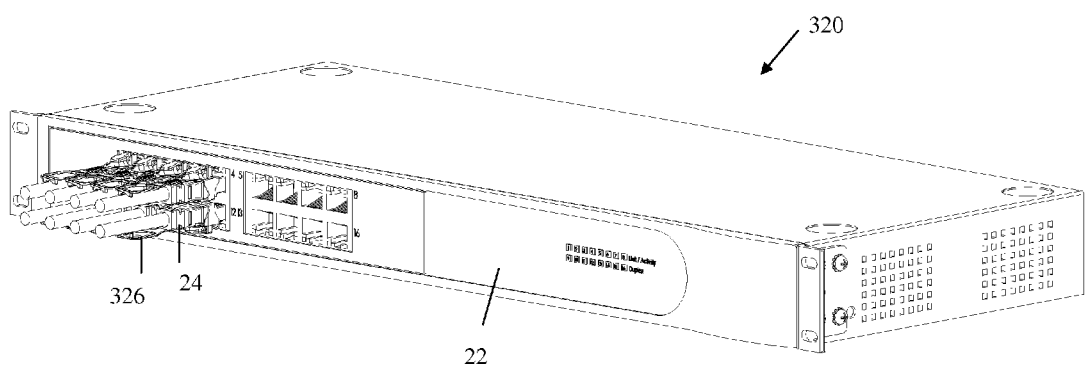
FIG. 16 is an isometric view of a communication system utilizing a third embodiment of a plug latch guard.

FIG. 16 shows system 320 with switch 22 populated with RJ45 cords 24 with third embodiment of latch guard 326 installed. System 320 can further include cabinets, racks, cable management, patch panels, overhead routing systems, horizontal cabling, and other such equipment.

Figure 17:
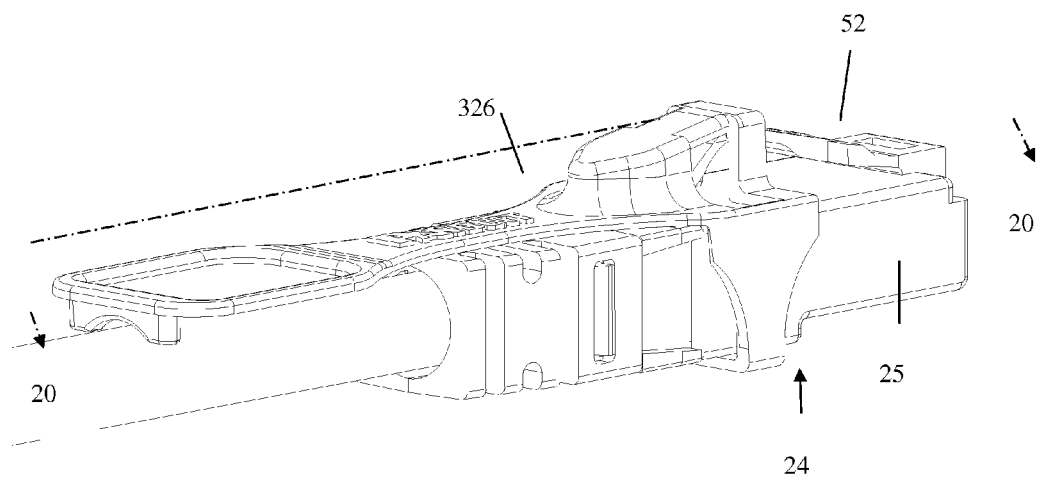
FIG. 17 is an isometric view of an RJ45 patchcord with an installed alternate plug latch guard.
Figure 18:
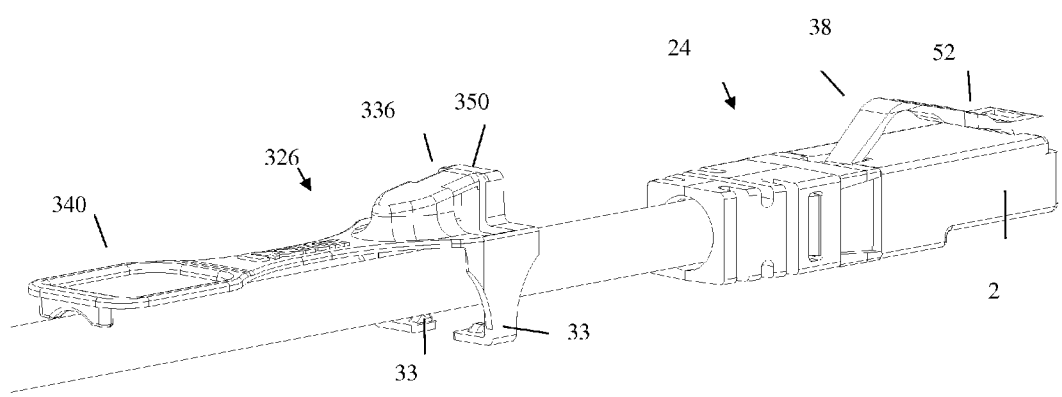
FIG. 18 is an exploded isometric view of the RJ45 and plug latch guard of FIG. 17.
Figure 19:
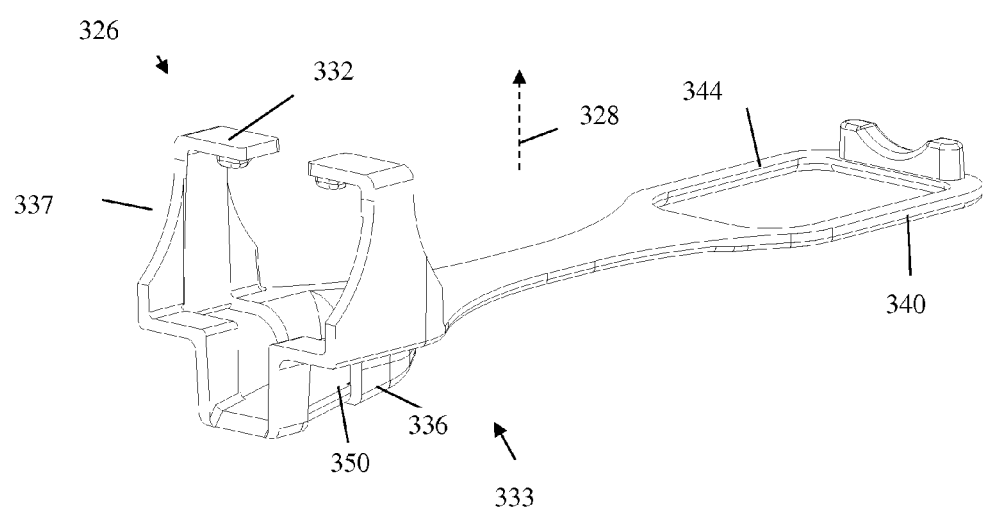
FIG. 19 is a rear isometric view of the plug latch guard of FIG. 17 rotated 180° about the cable axis.

FIG. 17 is an isometric view of RJ45 cord 24 with latch guard 326 installed, and FIG. 18 is an exploded isometric view in the orientation in which latch guard 326 would be installed onto RJ45 cord 24. This is different than the RJ45 plug latch guard of FIGS. 1-8, as latch guard 326 is installed from the rear instead of the front. FIG. 19 shows an isometric view of latch guard 326 rotated 180° about the cable axis and rotated 180° about the vertical axis 328. Ramp 336 on latch guard 326 extends higher than the apex of RJ45 plug latch 38 to prevent depression of latch 38. Arms 337 extend from opposite sides of front end 333 of release tab 340 such as to surround the sides of plug 25. Arms 237 then turn inwards towards each other at their respective ends.

Figure 20:
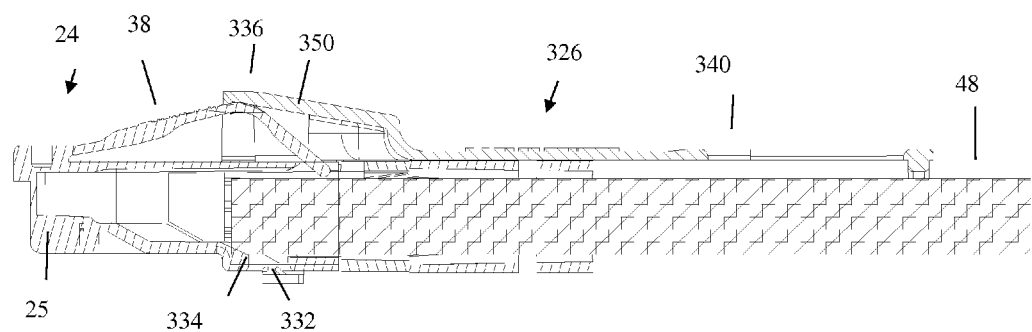
FIG. 20 is a cross-sectional view of the plug latch guard and RJ45 patchcord of FIG. 17 taken along section line 20-20 of FIG. 17.

FIG. 20 is a section view taken about section line 20-20 in FIG. 17, with tab 332 is inserted into crimp window 334, which is how latch guard 326 is secured to RJ45 cord 24. When latch guard 326 is installed on RJ45 cord 24, and there is an adjacent RJ45 cord 24 with latch guard 326 installed, arms 337 flex out perpendicular to the cable axis such that arms 337 interfere and prevent removal.

Figure 21:
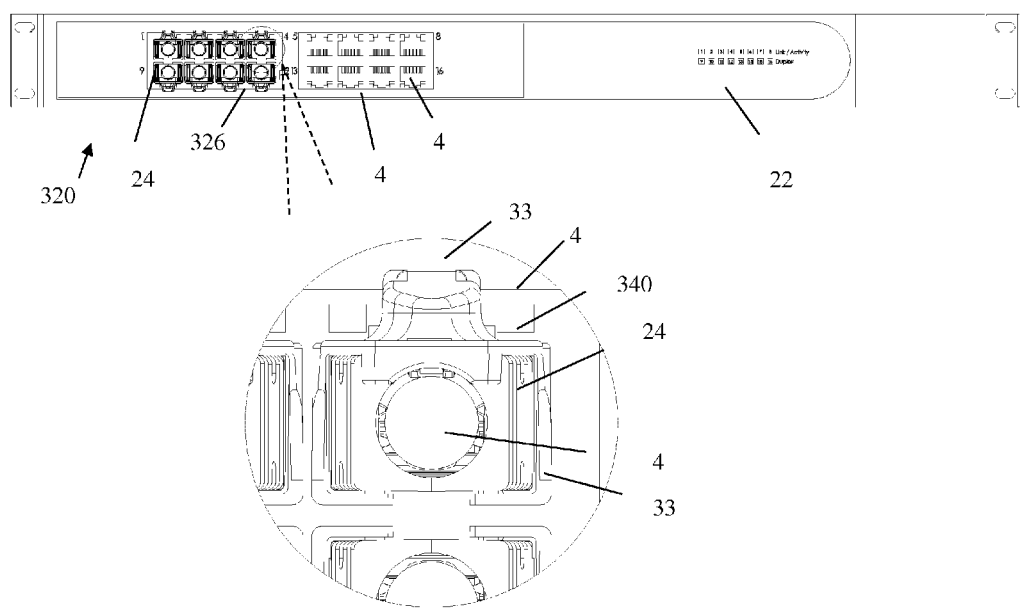
FIG. 21 is a front view of the communication system of FIG. 16, focusing on a single port.

FIG. 21 is a front view of communication systems 320, focused on a single port 41. Ramp 336 is positioned such that it allows for visibility of indicators/LED lights 43 on the front of the port 41. Release tab 340 is positioned such that, in switch 22, release tab 340 is towards the outside of switch 22 to increase accessibility.

Figure 22:
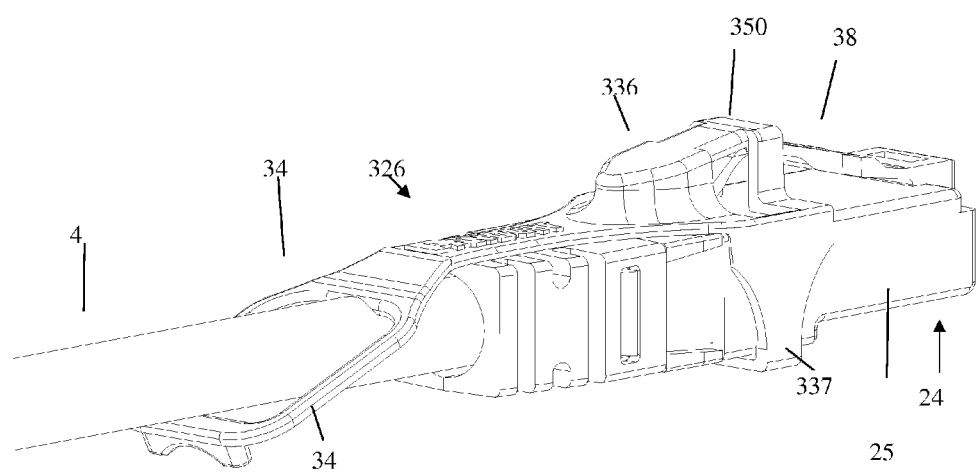
FIG. 22 is an isometric view of an alternate method of installing the plug latch guard of FIG. 17 onto the RJ45 patchcord of FIG. 17.

An alternate way for assembly of latch guard 326 onto RJ45 cord 24 is shown in FIG. 22 in which cord 24 is fed through opening 344 on back end 335 of release tab 340. Opening 344 on release tab 340 is large enough that RJ45 cord 24 can fit through opening 344 after cord 24 has been assembled. An advantage of this type of installation is that on smaller diameter cables 48 the separation between arms 337 is large enough that latch guard 326 may become dislodged from cord 24 and can become lost; consequently, the method of FIG. 22 avoids inadvertent dislodging of guard 326 from cord 24. Also, with this alternate assembly latch guard 326 applies pressure to cable 48 when not in use such that latch guard 326 does not slide along the length of the cable and become misplaced. However, this orientation does add to the amount of time needed to assemble latch guard 326 onto RJ45 cord 24, and in a brownfield application RJ45 cord 24 may need to be unplugged on at least one side of communication system 320.

Figure 23:
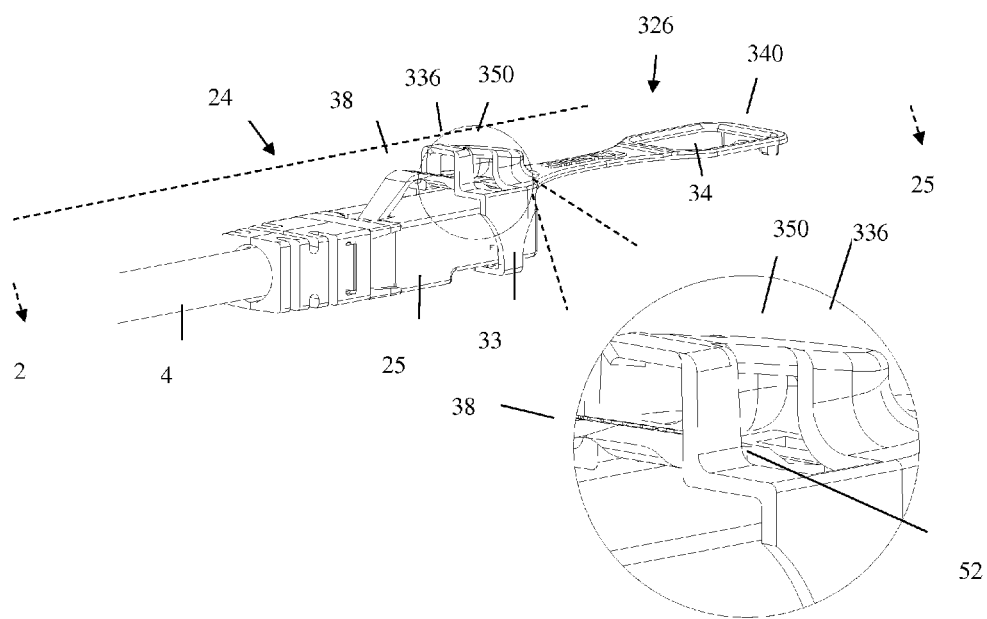
FIG. 23 is an isometric view of a secondary method of installing the plug latch guard of FIG. 17 onto the RJ45 patchcord of FIG. 17, focusing on the interaction point of the plug latch guard of FIG. 17 onto the RJ45 patchcord of FIG. 17.
Figure 24:
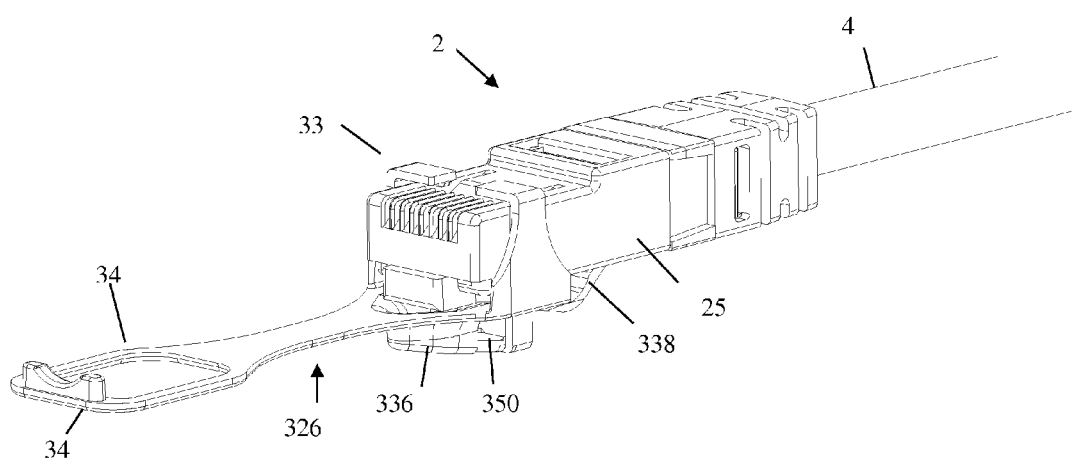
FIG. 24 is a rear isometric view of a secondary method of installing the plug latch guard of FIG. 23 onto the RJ45 patchcord of FIG. 23
Figure 25:
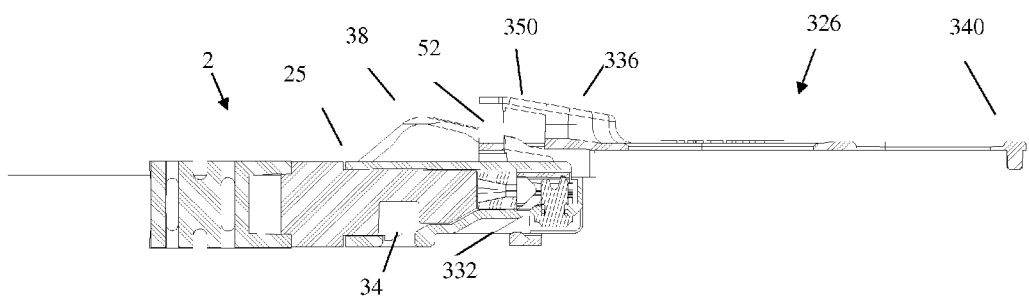
FIG. 25 is a cross-sectional view of the plug latch guard and RJ45 patchcord of FIG. 23 taken along section line 25-25 of FIG. 23.

FIG. 23 is a top isometric view of RJ45 cord 24 with latch guard 326 installed in the orientation in which latch guard 326 may be utilized as a pulling eye. FIG. 24 is a bottom isometric view of RJ45 cord 24 with latch guard 326 installed in the orientation in which latch guard 326 may be utilized as a pulling eye. FIG. 25 is a section view taken about section line 25-25 in FIG. 23. Pockets 350 secure latch 38 through plug latch stops 52 and prevent release of latch guard 326 when pressure is applied. Opening 344 acts as enclosed feature that fish tape can be applied during the pulling operation with a lower risk of having the fish tape slip than securing the fish tape to the rounded surface of cable 48. In order to release latch guard 326 from RJ45 cord 24 latch 38 needs to be depressed just as a plug would typically be released from an RJ45 jack. A secondary usage for the engagement feature of pockets 350 would be to hang up a patch cord when not in use on a hook, or in a store setting on sales hooks.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A latch guard for a communication plug including a latch, said latch guard comprising:
    a plug end configured for gripping the communication plug wherein said plug end has opposing arms extending along opposites sides of said plug, said arms extending to a point beyond an apex of a latch of said plug, the arms further configured to leave said latch of said plug uncovered; and
    a pull tab extending from said plug end said opposing arms curve inwards toward a top of the plug.

2. The latch guard of claim 1, wherein said pull tab includes a loop connected to said arm opposite said plug end.

3. The latch guard of claim 1, wherein the communication plug includes a housing with at least one depression, a portion of said plug end of said latch guard having a tab for engaging at least one said depression.

4. The latch guard of claim 3, wherein at least one said depression of the communication plug is a crimp window.

5. The latch guard of claim 1, wherein the communication plug is an RJ45 plug.

6. A communication cord, comprising:
    a communication cable;
    a communication plug connected to said communication cable, said communication plug including a latch; and
    a latch guard connected to the communication plug, the latch guard having a plug end configured for gripping the communication plug wherein said plug end has opposing arms extending along opposites sides of said plug, said arms extending to a point beyond an apex of a latch of said plug, the arms further configured to leave said latch of said plug uncovered, and a pull tab extending from said plug end said opposing arms curve inwards toward a top of the plug.

7. The communication cord of claim 6, wherein said pull tab includes a loop connected to said arm opposite said plug end.

8. The communication cord of claim 6, wherein the communication plug includes a housing with at least one depression, a portion of said plug end a tab for engaging at least one said depression.

9. The communication cord of claim 8, wherein at least one said depression of the communication plug is a crimp window.

10. The communication cord of claim 6, wherein the communication plug is an RJ45 plug.

* * * * *